Patented May 9, 1939

2,157,625

UNITED STATES PATENT OFFICE 2,157,625

HIGH MELTING POINT PARAFFIN WAXES AND COMPOSITIONS THEREOF

James M. Page, Jr., Casper, Wyo., assignor to Standard Oil Company, Chicago, Ill., a corporation of Indiana No Drawing. Application August 5, 1935, Serial No. 34,726

4 Claims. (Cl. 87—19)

This invention pertains to petroleum waxes and in particular to high melting paraffin waxes obtained from lubricating oil distillates.

Petroleum waxes known in petroleum refining may be classified in two general classes, namely; paraffin waxes obtained from wax-bearing distillates, in which I include the so-called slop waxes and slack waxes, and petrolatum wax which is present in wax-bearing residual stocks.

Paraffin waxes are separated from the low boiling wax distillates by chilling the latter to a temperature at which the wax crystallizes and separating it from the oil by filter pressing. This pressed wax is known in petroleum refinery terminology as slack wax. The wax cake is then submitted to a sweating operation to further free it of oil.

The higher boiling wax distillates contain wax of ill-defined crystalline structure which cannot be filter pressed or sweated to remove the oil from the wax as may be done with the low boiling wax distillates. The wax in the higher boiling distillates, which is known in the art as slop wax, may be changed to a crystalline structure to give a filterable and sweatable wax by submitting the heavy wax distillates to distillation to coke. The wax in the cracked distillate is of a crystalline structure and may be recovered in the same manner as paraffin wax from the lighter wax distillates. The wax recovered from the cracked distillate is also known as slack wax.

Purified paraffin wax from slack wax has a well defined crystalline structure, is hard and brittle and has a melting point of 105 to 145° F., depending upon the amount of oil left in the slack wax. Paraffin wax has been made substantially oil free by repeated solvent extraction; even under such extreme refinement no paraffin wax has been reported having a melting point greater than 160° F.

Petrolatum wax is obtained from wax bearing residual stocks by repeated cold settling in a solvent. This wax is of such malcrystalline structure as to be frequently considered amorphous. It is tough, coherent, tacky and non-brittle and has a melting point varying from 100 to 170° F., depending upon its oil content. It is almost invariably colored yellow and is never produced in pure white condition, even when highly refined. In a few cases petrolatum waxes with melting points as high as 180° F. have been reported.

To recapitulate, there have heretofore been known, (1) hard, brittle paraffin waxes of crystalline structure having melting points up to 160° F., and (2) tough, tacky petrolatum waxes of mal-crystalline or amorphous-like structure having melting points as high as 180° F.

Contrary to the teachings of the prior art, I have discovered that a hard, brittle crystalline wax having a melting point as high as 175 to 185° F. may be obtained from a heavy lubricating oil distillate.

An object of my invention is to obtain paraffin waxes having unusually high melting points. It is another object of my invention to obtain paraffin waxes of pronounced crystalline structure having extremely high melting points. It is still another object of my invention to obtain pure white paraffin waxes having melting points within the range of high melting point residual amorphous waxes but having the crystalline structure of distillate paraffin waxes. Still another object of my invention is to produce improved products in which my new high melting point distillate wax is an important element of the composition.

The waxes of my invention are obtained from the heavy lubricating oil distillates of wax-bearing crudes. The crude oil, after being topped to remove therefrom light oil fractions for motor fuels and illuminating oil purposes, is further distilled to give a light lubricating oil fraction and a heavy lubricating oil fraction, the latter having a Saybolt Universal viscosity at 210° F. of about 75 to 105 seconds. The heavy lubricating oil distillate after acid treatment and/or solvent extraction is diluted with a diluent, such as naphtha, and chilled to about —25° F., to produce a lubricating oil of the desired cold test, and the precipitated wax removed by suitable means, such as by filter pressing. The wax so obtained (slack wax) has a melting point of about 145° F. and contains about 50% oil. This slack wax is then dissolved in oleum spirits and chilled to about 70° F. to crystallize therefrom a paraffin wax having a melting point of about 170 to 175° F. which is further dissolved in oleum spirits and pressed at about 100° F. to produce a paraffin wax having a melting point of 180 to 185° F.

Although I may obtain these high melting point paraffin waxes from wax-bearing crudes in general, I prefer to use crudes having a comparatively high wax content, such as the crude oil obtained from the Salt Creek field of Wyoming.

In describing the method by which I obtain the high melting point waxes comprising my invention I shall use the slack wax from a lubricating oil distillate obtained from Salt Creek crude for the purpose of illustration and not with the intention of limiting the scope of my invention.

A Salt Creek crude distillate having a Saybolt viscosity of about 100 seconds at 210° F. is acid treated and solvent extracted with a suitable solvent, such as Chlorex. The acid treated and/or solvent extracted distillate is mixed with an equal volume of oleum spirits and filtered to color through an absorbent clay, and the filtrate chilled to about −25° F. and filter pressed to remove a slack wax of about 145° F. melting point and containing about 50% oil. This slack wax is dissolved in about 92% of a solvent, such as oleum spirits, and filter pressed at about 70° F. to give a pressed filtrate and a wax cake of 170 to 175° melting point having an oil content of about 8 to 9%. This wax cake is now redissolved in about 92% oleum spirits and chilled (or heated) to about 90 to 100° F., and the precipitated wax removed by filter pressing. The wax recovered has a melting point of about 180 to 185° F. and an oil content of less than 1%.

The wax so obtained is a hard, brittle, crystalline paraffin wax similar to other paraffin waxes from wax distillates in its brittleness and crystalline structure. It is unique in that it has a melting point far greater than any distillate paraffin wax ever reported. It is to be distinguished from the tough, tacky petrolatum waxes, which have been reported as having melting points as high as 180° F., in that these petrolatum waxes are residual waxes having such ill-defined crystalline structure as to be frequently referred to as amorphous.

The high melting point wax of my invention has an index of refraction at 88° C. of about 1.4360 and a density at 84° C. of about .7854. This wax also possesses the unusual property of being extremely stable at high temperatures as evidenced from the fact that a sample held at 200° F. for one month in an iron container dropped in color from 16 Saybolt to +15 Saybolt and had no odor. This wax is also free of acidity or saponifiable matter.

When this high melting point distillate wax is mixed with ordinary paraffin wax, the mixture has a melting point higher than the melting point of wax mixtures calculated from the formula $$\frac{X \cdot S_1 + Y \cdot S_2}{X + Y} = S_3$$

given by J. Kisser in Z Wiss. Mikroskop vol. 44 (1927) page 448, in which X=the per cent of wax having melting point $S_1$, Y=per cent wax having melting point $S_2$, and $S_3$=melting point of the mixture. In the following table I have tabulated the determined melting points of mixtures of paraffin wax with high melting point distillate wax and the comparison of these melting points with the calculated melting points of equivalent mixtures. The melting points were determined by the thermometer bulb melting point method in which a round bulb melting point thermometer is inserted into the molten wax heated to a temperature of about 20° above its melting point and then withdrawn so as to have a globule of the molten wax adhere to the bulb of the thermometer. The thermometer, held in a horizontal position, is then carefully rotated above the liquid until the globule wax is sufficiently solidified to rotate with the thermometer. The temperature at which this occurs is taken as the melting point of the wax or wax mixture.

*Table I*

| Percent paraffin wax 130° M. P. | Percent high melting point distillate wax 180° M. P. | Thermometer bulb melting point, °F. | Calculated M. P. °F. |
|---|---|---|---|
| 100 | | 130 | |
| 99 | 1 | 130 | 130.5 |
| 98 | 2 | 130 | 130.9 |
| 95 | 5 | 133 | 132.5 |
| 90 | 10 | 143 | 135.1 |
| 85 | 15 | 148 | 138.6 |
| 80 | 20 | 155 | 140.0 |

One of the special uses of my new wax is in the manufacture of candles.

The ordinary candles fabricated of paraffin wax of about 130° F. melting point and stearic acid as a hardening agent possess the undesirable property of softening and bending in hot weather. I have found that paraffin wax candles containing high melting point distillate wax have a much higher bend test than candles made from paraffin wax containing an equal amount of stearic acid. Even the substitution of a part of the stearic acid with the high melting distillate wax materially increases the bend test. The bend test is made to determine the rate of softening of the candle and is conducted by placing the candle in a horizontal position supported at its extreme ends, and determining the time in minutes required for the candle to sag or bend ¼″ from the horizontal when kept in an atmosphere maintained at a temperature of 100° F.

In Table II are tabulated the relative bend tests of paraffin wax of 130° melting point, mixtures of paraffin wax of 130° M. P. and high melting point distillate wax of 181° melting point, and mixtures of paraffin wax of 130° melting point with triple pressed stearic acid.

*Table II*

| Percent 130° F. M. P. paraffin wax | Hardened with stearic acid | | Hardened with high melting point paraffin distillate wax 181° F. M. P. | |
|---|---|---|---|---|
| | Percent stearic acid | Bend test | Percent wax | Bend test |
| | | Minutes | | Minutes |
| 100 | 0 | 29 | 0 | 29 |
| 99 | | | 1 | 62 |
| 98 | | | 2 | 69 |
| 95 | 5 | 53 | 5 | 110 |
| 90 | 10 | 81 | 10 | 450+ |
| 85 | 15 | 120 | | |
| 80 | 20 | 184 | | |

Referring to the foregoing table, it will be noticed that a mixture of 95% 130 M. P. paraffin wax and 5% high melting point distillate wax of 181° melting point has a bend test more than double that of a mixture containing an equivalent amount of triple pressed stearic acid and that a mixture containing 10% of the high melting point distillate wax has a bend test more than 5 times greater than that of a mixture containing an equivalent amount of stearic acid and has a bend test almost 2½ times that of a mixture containing 20% stearic acid.

In Table III I have tabulated the bend tests of paraffin wax candles of ⁵⁴⁄₆₄″ diameter containing varying proportions of stearic acid and/or high melting point distillate paraffin wax. The results tabulated therein clearly demonstrate the effectiveness of the addition of this high melting point distillate paraffin wax in improving the bend test of paraffin wax candles.

Table III

| Percent 132° F. M. P. paraffin wax | Percent 180° F. M. P. paraffin distillate wax | Percent stearic acid | Bend test at 100° F. |
|---|---|---|---|
| | | | Minutes |
| 100 | 0 | 0 | 43 |
| 90 | 0 | 10 | 78 |
| 90 | 10 | 0 | 350+ |
| 90 | 5 | 5 | 115 |
| 85 | 10 | 5 | 250 |

I may also add beeswax to the composition without impairing the non-bending quality of the candle. Thus a paraffin wax candle containing 35% paraffin wax of 130° F. melting point, 10% high melting point distillate paraffin wax of 181° F. melting point, 35% stearic acid and 20% beeswax possesses good non-bending and burning qualities.

The high melting distillate wax may be used to great advantage in the waxing of paper and paper-board. Much difficulty is experienced in the storage of paper products treated with ordinary paraffin wax because of the tendency of the waxed products to stick together; a condition known as "blocking". I have found that a small quantity of the high melting distillate wax added to low melting paraffin wax produced a wax which will not "block" and which is therefore suitable for coating paper products. Thus I have found mixtures of 23–70% 120–122° F. melting point paraffin wax, 24–75% 130–133° F. melting point paraffin wax and 1–6% 181–184° F. melting point distillate wax were substantially non-blocking. As examples of preferred mixtures I may mention the following:

| | A | B | C |
|---|---|---|---|
| 122° F. M. P. paraffin wax | 23.86% | 47.34% | 70.20% |
| 131° F. M. P. paraffin wax | 75.00% | 49.60% | 24.60% |
| 184° F. M. P. H. M. P. distillate wax | 1.14% | 3.06% | 5.20% |
| Melting point | 130° F. | 130° F. | 130° F. |
| Tensile strength | 80 | 63 | 65 |

Paper products treated with any of the above mixes can be stored and piled without danger of the waxed paper sticking or "blocking".

In addition to its application in candle making and paper waxing this high melting distillate wax may be used to advantage as a proofing agent in the preservation of foodstuffs, leathers, etc. and as an ingredient of wax polishes and electrical insulating products.

While I have given a lubricating oil distillate from Salt Creek crude by way of example as a specific source from which the novel high melting distillate wax may be obtained I do not intend to limit myself thereby but include all hydrocarbon waxes which come within the scope of the following claims.

I claim:
1. As a new composition of matter a wax mixture comprising a hard, brittle paraffin wax of crystalline structure having a melting point of about 181° F. and an index of refraction at 88° C. of about 1.436 obtained from a petroleum distillate and 60 to 90% paraffin wax having a melting point of about 130° F.

2. As a new composition of matter a wax mixture comprising a hard, brittle paraffin wax of crystalline structure having a melting point greater than 175° F. obtained from a petroleum distillate, a paraffin wax having a melting point of about 120 to 130° F. and stearic acid.

3. As a new composition of matter a wax mixture comprising about 10% hard, brittle, crystalline paraffin wax having a melting point greater than 175° F. obtained from a petroleum distillate, 35% paraffin wax of about 130° F. melting point, about 35% stearic acid and about 20% beeswax.

4. As a new composition of matter a wax mixture comprising 1% to 5% hard, brittle paraffin wax of crystalline structure having a melting point greater than 170° F. obtained from a petroleum distillate and 95% to 99% paraffin wax having a melting point of about 120 to 133° F.

JAMES M. PAGE, JR.

---

CERTIFICATE OF CORRECTION.

Patent No. 2,157,625. May 9, 1939.

JAMES M. PAGE, JR.

It is hereby certified that error appears in the printed specification of the above numbered patent requiring correction as follows: Page 3, second column, line 40, claim 4, for "170° F." read 175° F.; and that the said Letters Patent should be read with this correction therein that the same may conform to the record of the case in the Patent Office.

Signed and sealed this 13th day of June, A. D. 1939.

Henry Van Arsdale
Acting Commissioner of Patents.

(Seal)